US006443333B1

(12) United States Patent
Vanmoor

(10) Patent No.: US 6,443,333 B1
(45) Date of Patent: Sep. 3, 2002

(54) CAULKING CARTRIDGE WITH AFTERFLOW PREVENTION AND IMPROVED PURGING OF CARTRIDGE CONTENTS

(76) Inventor: Arthur Vanmoor, P.M.B. 219 22 SE. 4th St., Boca Raton, FL (US) 33432

( * ) Notice: Subject to any disclaimer, the term of this patent is extended or adjusted under 35 U.S.C. 154(b) by 0 days.

(21) Appl. No.: 09/477,758

(22) Filed: Jan. 4, 2000

Related U.S. Application Data

(60) Continuation-in-part of application No. 09/322,788, filed on May 28, 1999, now Pat. No. 6,119,903, which is a division of application No. 08/990,349, filed on Dec. 15, 1997, now Pat. No. 5,934,506, which is a division of application No. 08/710,342, filed on Sep. 16, 1996, now Pat. No. 5,704,518, which is a division of application No. 08/527,755, filed on Sep. 13, 1995, now Pat. No. 5,582,331.

(30) Foreign Application Priority Data

| | | |
|---|---|---|
| Sep. 13, 1994 | (NL) | 9401492 |
| Dec. 15, 1999 | (NL) | 0103845 |

(51) Int. Cl.[7] ..... G01F 11/06
(52) U.S. Cl. ..... 222/327; 222/386
(58) Field of Search ..... 222/325, 326, 222/327, 386, 391

(56) References Cited

U.S. PATENT DOCUMENTS

| | | | | | |
|---|---|---|---|---|---|
| 2,093,386 | A | * | 9/1937 | Tear | 222/386 |
| 2,695,735 | A | * | 11/1954 | Van Doornik | 222/386 |
| 3,066,836 | A | * | 12/1962 | Trumbull | 222/327 |
| 4,030,643 | A | * | 6/1977 | Van Manen | 222/386 |
| 4,645,098 | A | * | 2/1987 | Hoffmann | 222/386 |
| 4,792,065 | A | * | 12/1988 | Soehnlein et al. | 222/386 X |
| 4,834,268 | A | * | 5/1989 | Keller | 222/327 |
| 4,899,910 | A | * | 2/1990 | Tabei et al. | 126/263.01 |
| 5,158,214 | A | * | 10/1992 | Volpe et al. | 206/219 |
| 5,782,815 | A | * | 7/1998 | Yanai et al. | 222/386 X |
| 5,951,527 | A | * | 9/1999 | Sudo | 604/218 |

FOREIGN PATENT DOCUMENTS

| | | | | |
|---|---|---|---|---|
| EP | 000495734 A1 | * | 7/1992 | 222/386 |
| WO | WO 94/21537 | * | 9/1994 | 222/386 |

* cited by examiner

*Primary Examiner*—Lesley D. Morris
*Assistant Examiner*—Stephanie L. Willatt
(74) *Attorney, Agent, or Firm*—Laurence A. Greenberg; Werner H. Stemer; Ralph E. Locher

(57) ABSTRACT

The caulking cartridge alleviates the afterflow prolem and assures that substantially all of the caulking composition can be driven from the cartridge. The cartridge has a tubular body, a forward dispensing opening at a forward end of the tubular body, and a backwall movably disposed within the tubular body. The backwall has a shape that is complementary to a shape of the forward end of the tubular body. This ensures that the composition is completely purged from the tubular body when the backwall is pushed against the forward end. The backwall may be formed to slide contactlessly within the tubular body, preferably by way of a reduced diameter of the backwall relative the inner diameter of the tubular body, so that it is pushed backwardly when the body retracts radially after actuation.

5 Claims, 4 Drawing Sheets

CAULKING CARTRIDGE WITH AFTERFLOW PREVENTION AND IMPROVED PURGING OF CARTRIDGE CONTENTS

This is a continuation-in-part of my application Ser. No. 09/322,788, filed May 28, 1999, now U.S. Pat. No. 6,119, 903; which was a division of application Ser. No. 08/990, 349, filed Dec. 15, 1997, now U.S. Pat. No. 5,934,506; which was a division of application Ser. No. 08/710,342, filed Sep. 16, 1996, now U.S. Pat. No. 5,704,518: which was a division of application Ser. No. 08/527,755, filed Sep. 1995, now U.S. Pat. No. 5,582,331. All of the prior disclosures are herewith incorporated by reference.

BACKGROUND OF THE INVENTION

1. Field of the Invention

The invention relates to caulking guns and to dispensing cartridges, and more particularly to the type of composition dispensers in which a cartridge is placed into a so-called caulking gun and a piston urges a plunger forwardly from the rear of the cartridge, thus reducing a volume available for the composition inside the cartridge and forcing the composition from an open tip at the front of the cartridge. These types of caulking guns have been the subject of undesirable afterflow, i.e. the interior of the cartridge is still subject to overpressure after the plunger is no longer actively urged forward and, as a result, additional amounts of composition are forced from the cartridge.

Two primary reasons for the afterflow phenomenon are recognized. Firstly, the usually thin-walled cartridge expands during the plunger actuation and, according to the physical law that systems always attempt to return to the relaxed state, the cartridge wall relaxes after the plunger actuation. Due to the fact that prior art backwalls of the cartridges have been devised to retain their forward-most position and that the plunger of the caulking gun is typically locked against a return movement, the relaxation of the cartridge wall leads to afterflow, i.e. to oozing at the dispensing tip. Secondly, most caulking compositions have a high degree of viscosity and are at least marginally compressible, which, upon plunger actuation, causes a substantial internal pressure buildup which, after the plunger is no longer forced forward, also leads to oozing at the dispensing tip.

The prior art systems are subject to a further drawback. Due to the generally flat design of the cartridge backwall and the rounded, oblique, and nozzle-shaped forward tip of the cartridge, a certain amount of caulking composition remains in the cartridge even after the backwall has reached its forward-most position. The caulking cartridge is thus usually disposed of with a considerable amount of composition still in the cartridge.

2. Description of the Related Art

The afore-described afterflow problem is often answered in the context of conventional prior art structures by quickly releasing and moving back the gun plunger as soon a sufficient amount of composition has been dispensed.

My above-mentioned U.S. Pat. Nos. 5,582,331; 5,704, 518; and 5,934,506 disclose a system in which the afterflow problem is largely solved. The outer diameter of the backwall is adjusted relative to the inner diameter of the cartridge such that the backwall will readily move back when the plunger no longer pushes the backwall forward towards the dispensing tip. As will be seen from the following description, I have further improved the invention based on the originally disclosed principles.

U.S. Pat. No. 5,236,105 to Galex describes an older system for preventing over-ejection. There, conventional caulking guns are retrofitted with several members, namely a female element, male element, a return spring, and a stop. The spring is utilized as an active bias sing element which actively pulls back the backwall in the cartridge and thus introduces a relative vacuum inside the cartridge.

U.S. Pat. No. 4,834,268 to Keller describes a plunger system in which an elastic sealing ring is urged towards the inner wall surface of the cartridge by a radial component of the force which urged to plunger forwardly in the dispensing mode. When the plunger is no longer actuated, the sealing ring relaxes slightly and allows the plunger to relax the inside cartridge pressure.

My earlier disclosures and all of the prior art patents have in common that a considerable amount of caulking composition remains in the caulking cartridge after the backwall has reached is forward-most position. In other words, even after the caulking cartridge is “completely spent,” the cartridge still contains a considerable amount of caulking composition and the cartridge is typically disposed of with an unnecessary amount of caulking composition. Not only does this cause unnecessary waste, but it also unnecessarily burdens the environment.

SUMMARY OF THE INVENTION

It is accordingly an object of the invention to provide a caulking cartridge with afterflow prevention and improved purging of cartridge content, which overcomes the above-mentioned disadvantages of the prior art devices and methods of this general type. The primary objects are to provide a simple and inexpensive system which safely prevents overflow or over-ejection and which enables virtually complete purging of the cartridge contents in regular use.

With the foregoing and other objects in view there is provided, in accordance with the invention, an improved caulking cartridge, of the type having a substantially tubular body with a wall having an inner wall surface, a forward dispensing opening at a forward end of the tubular body, a backwall movably disposed within the tubular body, and the tubular body defining a chamber therein bounded by the inner wall surface, the forward end and the backwall, for storing therein a composition to be dispensed through the forward dispensing opening. The improvement comprises:

the backwall having a shape substantially complementary to a shape of the forward end of the tubular body for substantially completely purging the composition from the tubular body when the backwall is pushed against the forward end.

In accordance with an added feature of the invention, the backwall is formed with a nipple substantially equal in size and shape to the forward dispensing opening for driving the composition from the forward dispensing opening when the backwall is pushed against the forward end of the tubular body.

In accordance with an additional feature of the invention, the inner wall surface defines an inner diameter of the tubular body, and wherein the backwall has an outer diameter adapted to the inner diameter of the tubular body such that the composition is allowed to flow into an annular space formed between the inner wall surface and a periphery of the backwall, whereby the backwall moves backwardly away from the forward end of the tubular body when a pressure inside the chamber is greater than a pressure outside the chamber.

In accordance with another feature of the invention, the backwall is formed with a skirt pointing backwardly away from the backwall.

In accordance with a further feature of the invention, the inner wall surface defines an inner diameter of the tubular body, the backwall has an outer diameter substantially equal to the inner diameter of the tubular body, and the skirt has an outer diameter less than the inner diameter of the tubular body.

In accordance with again an added feature of the invention, the skirt is formed with a spacer ring at an end thereof distal from the backwall.

In accordance with an alternative feature of the invention, the skirt is formed with a plurality of spacer tabs at an end thereof distal from the backwall. In this case, it is possible to form the skirt is a plurality of tab strips extending from the backwall to the spacer tabs.

With the above and other objects in view there is provided a further improvement, namely:

the backwall having a skirt formed thereon pointing backwardly away from the backwall and being formed with a stop surface distally from the backwall;

the skirt having an outer diameter less than the inner diameter of the tubular body and forming a space between the skirt and the inner wall surface;

a sealing ring disposed in the space between the skirt and the inner wall surface and sealing against the inner wall surface, the sealing ring having an axial width less than a spacing distance between the stop surface and the backwall.

In accordance with again an additional feature of the invention, the backwall has an outer diameter substantially equal to the inner diameter of the tubular body.

In accordance with again a further feature of the invention, the stop surface may be formed on the spacer ring or the individual spacer tabs.

Other features which are considered as characteristic for the invention are set forth in the appended claims.

Although the invention is illustrated and described herein as embodied in a caulking cartridge with afterflow prevention and improved content purging, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
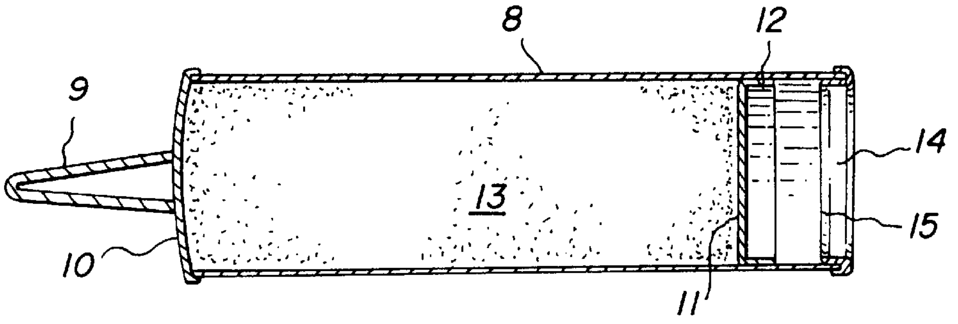
Fig. 1 PRIOR ART
FIG. 1 is a longitudinal section of a prior art caulking cartridge.

Referring now to the figures of the drawing in detail and first, particularly, to FIG. 1 thereof, there is seen a conventional prior art caulking cartridge or caulking tube with a cylindrical-tubular body 8. The body is formed as a cylindrical tube 8, which is formed of paper laminate, fibrous plastics, rolled metal sheets, or the like. The cylindrical tube 8 is relatively soft and, in response to increased pressure in the interior chamber thereof, it expands radially. A nozzle tip 9 is formed on a forward closure wall 10. The tube 8 is air-tightly closed in the rear with a backplate 11. An outer cylindrical flange 12 of the backplate 11 has an outer radius which corresponds to an inner radius of the tube 8. The flange 12, which is also referred to as a skirt, forms a sliding seal between the inner wall surface of the tube 8 and the backwall 11. A reinforcing ring 14 with a cylindrical seal flange 15 is clamped at the rear edge of the tube 8. In storage, the backwall 11 is disposed directly adjacent the ring 14, such that the flange 12 is clamped under the seal flange 15. Only after the forward wall 10 is punctured and the nozzle tip 9 is cut to form a dispenser opening is the backwall 11 pushed forward for dispensing caulking composition 13.

As the backwall 11 is pushed forward and the flange 12 slides along the inner wall surface of the tube 8, the caulking composition 13 is forced from the dispensing tip because of the increased pressure inside the tube chamber. Besides pushing composition 13 out of the dispensing tip, the increased pressure also causes the tube body to expand radially. In fact, it can be shown that the radial pressure on the cylindrical tube wall is exactly twice the axially acting pressure towards the dispensing opening. This radial "breathing" of the tube 8 causes afterflow when the piston 4 is no longer actuated and the tube 8 resiliently relaxes its increased diameter towards the relaxed position.

Figure 2:
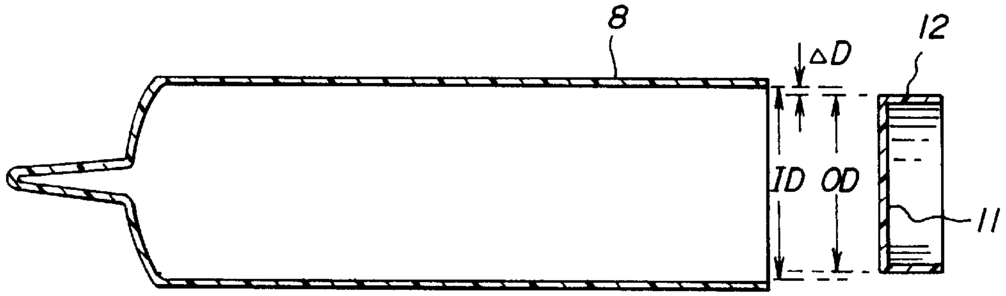
FIG. 2 is a longitudinal section of a caulking cartridge as it is disclosed in my above-mentioned earlier patents.

Referring now to FIG. 2, which illustrates an embodiment of the invention that was disclosed in my earlier patents, an outer diameter OD of the cylindrical flange 12 is smaller than an inner diameter ID of the tube 8 by a spacing $\Delta D$. The spacing $\Delta D$ is chosen in dependence on the caulking composition 13, i.e., on the viscosity and its reaction rate with air. In other words, the higher the viscosity of the composition (less flowable), the greater the spacing $\Delta D$. Further, the more inert the composition is relative to the atmosphere, the greater the spacing $\Delta D$. In general, tubes for typical silicones, glycerol esters, resin and rosin acids, and the like may be provided with a spacing of $\Delta D = 1$ mm.

Tubes for compositions with lower viscosity may be provided with $\Delta D \leqq 0.2$ mm. Proper spacings may be chosen by those of skill in the art.

The flange 12 and the inner wall surface of the tube 8 form a contact-less seal by virtue of a small amount of caulking composition which is allowed to seep therebetween. Due to the fact that the dispensing opening is substantially larger in area than the area defined (approximately) by the spacing $\Delta D$ times the circumference, only a negligible amount of caulking composition is allowed to escape through that route. As soon as the pressure on the piston is relaxed and the piston is moved back, the backwall 11 follows suit as the tube wall attains its relaxed position. As the caulking composition within the spacing between the flange 12 and the tube is still fresh (its viscosity is at its minimum), the backwall 11 slides easily. Shortly after the backwall has reached its relaxed position (i.e. the tube body is relaxed), the remaining caulking composition which is exposed to air is allowed to harden, and thus form a proper seal. The remaining composition within the cartridge chamber is sealed against the atmosphere.

After manufacture, i.e. during shelf storage before initial use, the backwall 11 is sealed similarly to conventional prior art systems.

The caulking tube system with a spacing $\Delta D>0.0$ mm may at first appear illogical because the compositions contained in such tubes cure upon contact with the air and any such opening rather goes against common sense. However, the inventor has been able to ascertain that, after actuation, a sealing ring of dried composition forms between the flange 12 and the inner wall surface of the tube 8. As the piston 4 pushes the backwall 11 forward during the next dispensing operation, that temporary seal is broken and the slide seal between the flange 12 and the inner wall surface of the tube 8 is effected by soft composition. When the pressure on the piston 4 by the piston stem 3 is relaxed immediately after dispensing, the contracting tube 8 is able to push the backwall 11 back, instead of causing undesirable afterflow.

Figure 3:
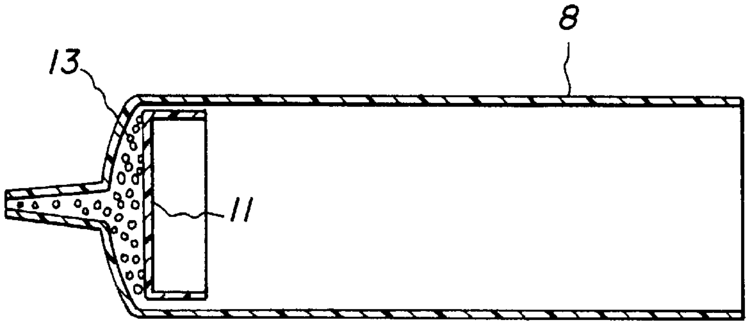
FIG. 3 is a longitudinal section of a caulking cartridge at a position in which the backwall has reached its forwardmost position and a vestige amount of caulking composition remains in the cartridge.

Referring now to FIG. 3, a problem that is common to the prior art cartridge of FIG. 1 and the cartridge of FIG. 2 is that a certain amount of caulking composition 13 remains in the region of the forward end of the cartridge even after the backwall has been fully pushed forward. Depending on the sectional shape of the forward tip area of the caulking cartridge, the amount of the remaining composition 13 may make up several percent of the entire amount of caulking composition that had been originally loaded in the cartridge. The result is unnecessary waste and further strain on the environment.

Figure 4:
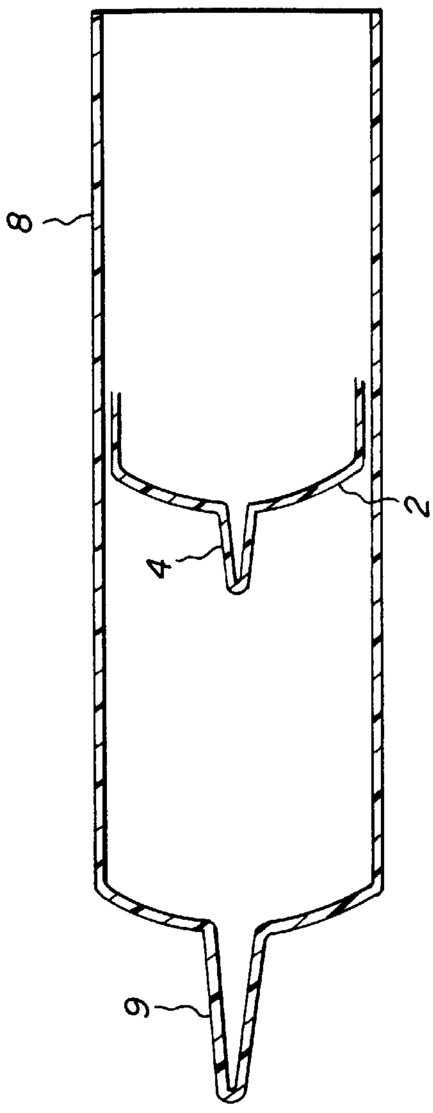
FIGS. 4 and 5 are longitudinal sections of the cartridge assembly with improved backwall structures according to the invention.
Figure 5:
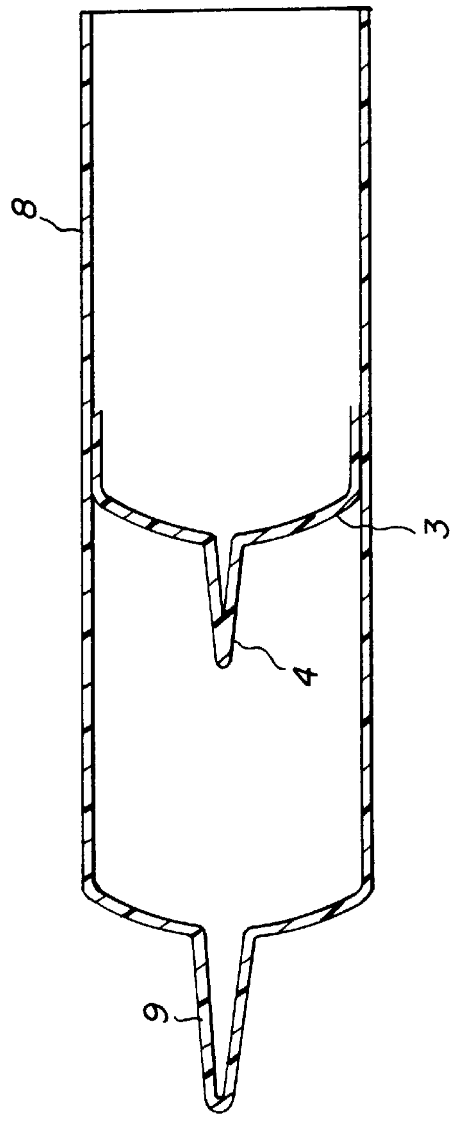

Referring now to FIGS. 4 and 5, the invention solves the foregoing problem by more closely adapting the shape of the backwall 11 to the shape of the forward dispensing area of the cartridge body 8. In other words, the shape of the backwall in these embodiments is substantially complementary to the shape of the forward end of the cartridge body 8. As illustrated in FIGS. 4 and 5, this adaptation is applicable both to my above-outlined backwall with the reduced diameter (backwall 2 in FIG. 4) and to the backwall with the conventional diameter (backwall 3 in FIG. 5) which defines the interference fit with the cylinder body 8 of the cartridge. The term interference fit, in this context, means that the outer diameter (OD) of the backwall 3 is slightly greater or equal to the inner diameter (ID) of the cartridge body 8, i.e., $OD_3 \geqq ID_8$. In the combination of FIG. 4, on the other hand, the relationship is $OD_2<ID_8$.

Figure 6:
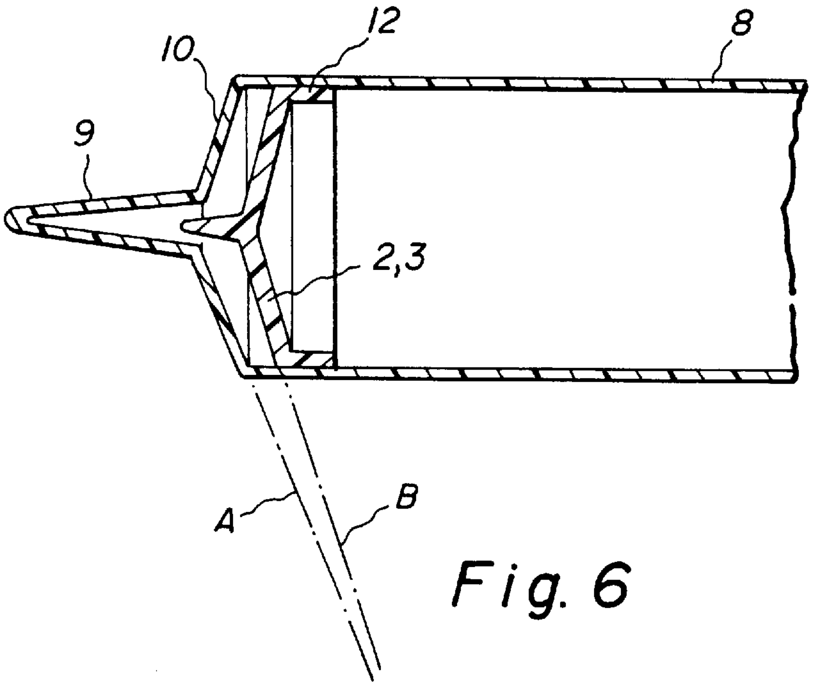
FIG. 6 is a partial sectional, diagrammatic view of a forward dispensing end of the novel cartridge.

Referring now to the slightly diagrammatic illustration of FIG. 6, the forward wall of the cartridge body 8 merges obliquely towards the dispensing nipple 9. The backwall 2, 3 mirrors the shape of the forward end, i.e., the backwall merges obliquely from the skirt 12 towards the central nipple 4. The oblique orientation of the merging walls, however, is not identical. As illustrated by the dash-dotted lines A and B, the wall 2,3 is slightly steeper than the wall 10. This has the effect that the last vestiges of caulking composition are squeezed towards the dispensing opening when the backwall 2,3 approaches the wall 10. Since the material of the caulking cartridge is usually relatively soft, the added pressure exerted by the plunger will slightly deform the backwall 2,3 so that the wedge formed between the walls 2 and 10, or 3 and 10, respectively, collapses from the outside in towards the dispensing opening in the nipple 9. Similarly, the nipple 4 is preferably shaped to squeeze any remaining caulking composition 1 out of the dispensing nozzle 9.

It will be understood by those skilled in the mechanical arts that the principle explained with regard to the different angular orientation of the surfaces A and B is equally applicable to rounded forward walls 10. The angular orientation of each point on the wall 10 is thereby slightly less steep (relative to the longitudinal axis) than the angular orientation of a corresponding point on the wall 2,3 that is aligned axially with the wall 10.

Figure 7:
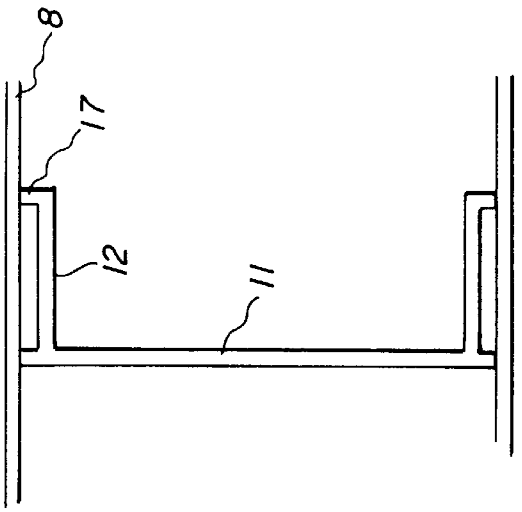
FIG. 7 is a partial sectional view of a further embodiment of the invention.

With reference to FIG. 7, in an alternative embodiment of the invention, the backwall 11 has an outer diameter OD that corresponds substantially to the inner diameter ID of the cylinder 8, i.e., $OD_{11}=ID_8$. The skirt 12, however, is disposed with a spacing distance from the wall 8, that is the outer diameter $OD_{12}<ID_8$. In order to assure proper sliding alignment of the backwall 11 with the skirt 12, the rearward end of the skirt 12 is formed with either a complete ring 17 or a few (typically between three and eight) individual spacer tabs 17. The backwall 11 and the ring or spacers 17 form a minimal sliding surface area with the inner surface of the wall 8. Frictional resistance to the relaxation of the backwall, i.e., its moving back to alleviate overpressure inside the chamber containing the caulking composition, is thus reduced to a minimum.

Figure 8:
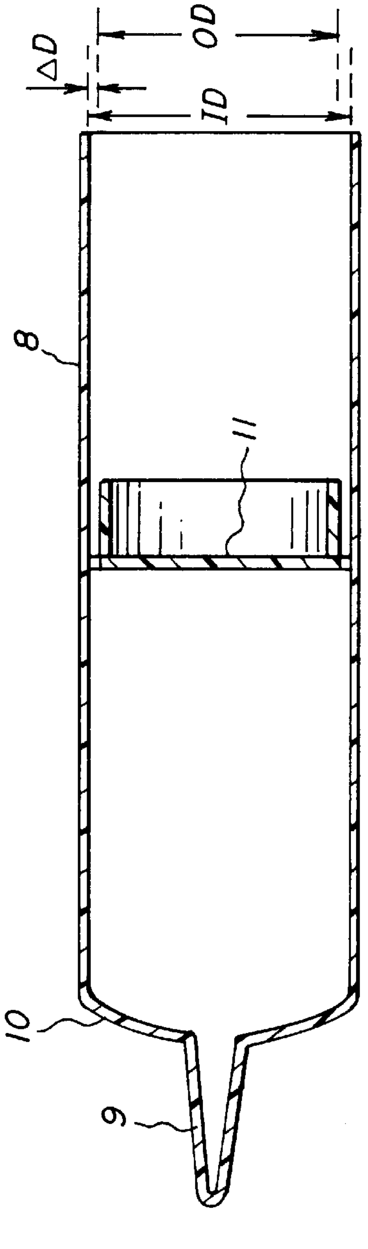
FIG. 8 is a longitudinal section of a further embodiment of the invention.

With reference to FIG. 8, there is shown a hybrid embodiment between the older prior art and my inventive principle. Here, the frictional resistance is reduced to a minimum in that only a narrow ring on the outer periphery of the backwall 11 touches the inner surface of the wall 8. Depending on the viscosity of the caulking composition to be loaded into the assembly, the outer diameter of the wall 11 is chosen to be approximately equal to the inner diameter of the wall 8. The measurements may thereby vary from an interference fit, namely $OD_{11}>ID_8$, to a slight spacing, namely $OD_{11} \leqq ID_8$. The skirt, in this embodiment, has an outer diameter that is less than the inner diameter of the wall 8.

Figure 9:
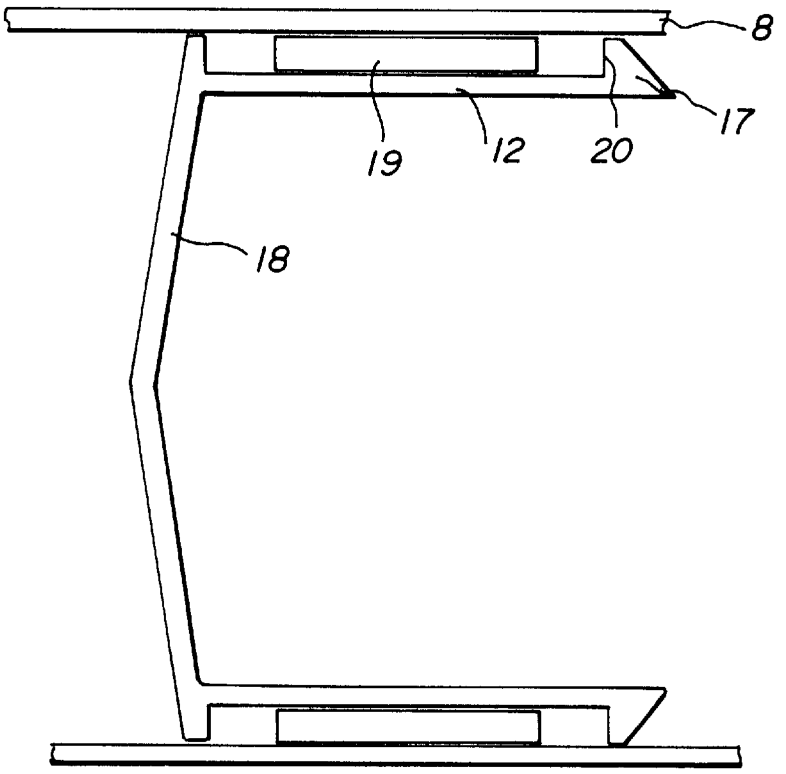
FIG. 9 is a partial longitudinal section of an alternative embodiment of the caulking cartridge according to the invention.

With reference to FIG. 9, there is provided a complete sealing ring 19. The ring 19 is disposed between the skirt 12 and the wall 8. Similarly to the embodiment of FIG. 7, the skirt 12 is formed either with a ring or several tabs 17. In this embodiment, a minimum of two tabs 17 are required. Furthermore, the skirt 12 may also be in the form of several strips each connecting a respective tab 17 to the wall 18. Following the principles described with reference to FIGS. 4, 5, and 6, the wall 18 is roof-shaped or dome-shaped, so as to ensure virtually complete purging of the contents of the cartridge.

As the wall 18 is pushed forward (to the left in FIG. 9) together with the skirt 12 and the ring or tabs 17, a stop surface 20 slaves the sealing ring 19 along in the forward direction. When the plunger is released, the backwall 18 moves backward (to the right in FIG. 9) on account of the higher pressure inside the chamber to the left of the backwall 18. Since the axial spacing distance between the backwall 8 and the stop surface 20 of the ring or tabs 17 is greater than the axial width of the sealing ring 19, the sealing ring 19 does not move back together with the backwall 18 and the skirt 12. The amount of the relaxing backward move of the backwall 18 is approximately limited by the difference in the spacing distance from 18 to 20 and the width of the ring 19. The assembly is preferably formed so that the sealing ring 19 has a slight interference fit with the wall 8, so as to assure complete sealing between the ring 19 and the wall 8, but is slightly spaced from the skirt 12 or tab strips 12. This allows the skirt 12 to move easily and freely relative to the sealing ring 19, unless, of course, the sealing ring 19 is slaved along by the stop surface 20 or it abuts the backwall 18 on the other side.

It will be understood that in each of the embodiments shown in FIGS. 7–9, the backwall 18 may be formed in accordance with FIGS. 4, 5, and 6.

While I have herein referred to "caulking guns" and "caulking compositions," it should be clear that the terms are to be understood as commonly used in the art, namely any such dispenser with piston-actuated volume reduction in tubular containers and with compositions of any type which are subject to the afore-mentioned afterflow problem.

I claim:

1. An improved caulking cartridge, of the type having a substantially tubular body with a wall having an inner wall surface defining an inner diameter of the tubular body, a forward dispensing opening at a forward end of the tubular body, a backwall movably disposed within the tubular body, and the tubular body defining a chamber therein bounded by the inner wall surface, the forward end and the backwall, for storing therein a composition to be dispensed through the forward dispensing opening, the improvement which comprises:

said backwall having a skirt formed thereon pointing backwardly away from said backwall and being formed with a stop surface distally from said backwall;

said skirt having an outer diameter less than the inner diameter of the tubular body and forming a space between said skirt and the inner wall surface;

a sealing ring disposed in said space between said skirt and the inner wall surface and sealing against the inner wall surface, said sealing ring having an axial width less than a spacing distance between said stop surface and said backwall, such that said backwall together with said skirt can be axially moved through a given distance while said sealing ring remains stationary on the inner wall surface.

2. The caulking cartridge according to claim 1, wherein said backwall has an outer diameter substantially equal to the inner diameter of the tubular body.

3. The caulking cartridge according to claim 1, wherein said backwall has a shape substantially complementary to a shape of the forward end of the tubular body, for substantially completely purging the composition from the tubular body when the backwall is pushed against the forward end.

4. The caulking cartridge according to claim 1, wherein said skirt is formed with a spacer ring defining said stop surface at the end thereof distal from said backwall.

5. The caulking cartridge according to claim 1, wherein said given distance corresponds to a difference between the axial width of said sealing ring and the spacing distance between said stop surface and said backwall.

* * * * *